Figure 1:
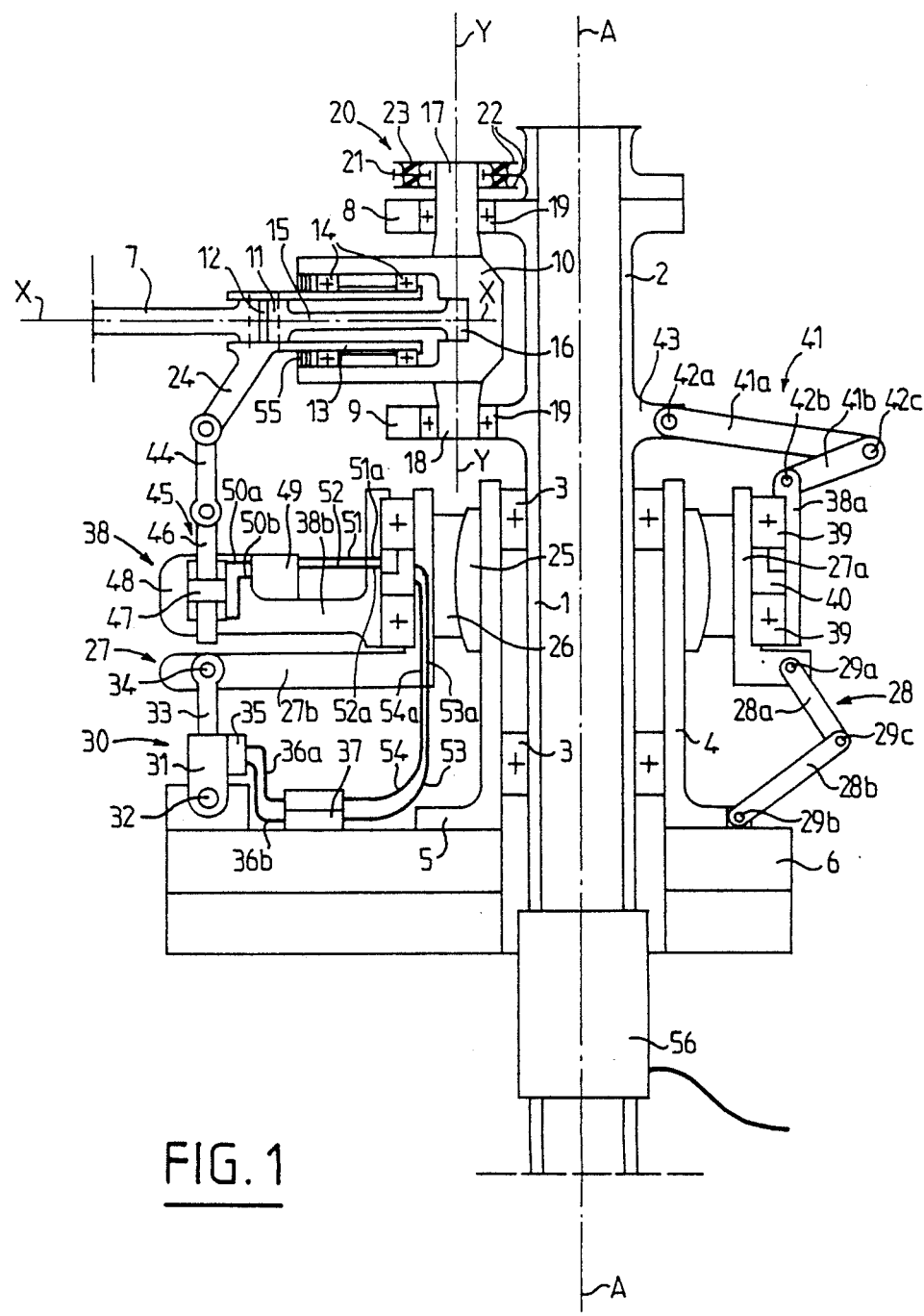

United States Patent [19]

Aubry et al.

[11] Patent Number: 4,952,120

[45] Date of Patent: Aug. 28, 1990

[54] CONTROL DEVICE FOR MONOCYCLIC PITCH IN A FIXED REFERENCE SYSTEM AND MULTICYCLIC PITCH IN A ROTATING REFERENCE SYSTEM FOR BLADES OF ROTORS OF ROTOR CRAFT

[75] Inventors: Jacques A. Aubry, Cabries; Jean J. Mondet, Pelisanne, both of France

[73] Assignee: Societe Nationale Industrielle et Aerospatiale des Poudres et Explosifs, Paris, France

[21] Appl. No.: 405,266

[22] Filed: Sep. 11, 1989

[30] Foreign Application Priority Data

Sep. 16, 1988 [FR] France .................. 88 12141

[51] Int. Cl.⁵ .............................................. B63H 3/00
[52] U.S. Cl. ........................................ 416/114; 416/98
[58] Field of Search ..................... 416/114, 158, 98

[56] References Cited

U.S. PATENT DOCUMENTS

| | | | |
|---|---|---|---|
| 2,306,703 | 12/1942 | Kost | 416/114 |
| 2,427,939 | 9/1947 | Avery | 416/114 |
| 2,491,260 | 12/1949 | Green | 416/114 X |
| 2,703,147 | 3/1955 | Peterson | 416/158 X |
| 3,102,597 | 9/1963 | Drees . | |
| 3,144,903 | 8/1964 | Pascher . | |
| 3,623,682 | 11/1971 | Kretz | 416/98 X |
| 3,625,632 | 12/1971 | Casterline | 416/98 |

FOREIGN PATENT DOCUMENTS

FR-A-
2607465  6/1988  France .

OTHER PUBLICATIONS

Journal of The American Helicopter Society, vol. 27, No. 3, Juillet 1982, pp. 25–31, New York, US; K. F. Guinn: "Individual Blade Control Independent of a Swashplate".

*Primary Examiner*—William E. Wayner
*Attorney, Agent, or Firm*—Armstrong, Nikaido, Marmelstein, Kubovcik & Murray

[57] ABSTRACT

The invention relates to a control device for monocyclic pitch in a fixed reference system and multicyclic pitch in a rotating reference system, for the blades (7) of a rotor craft.

In addition to conventional swashplates (27, 38), one (38) of which rotates (39) on the other (27) held in rotation by a nonrotating compass (28), but which slides axially (4) and oscillates (25) about the rotor mast (1), through the action of pilot control (30), it comprises multicyclic jacks (45) in a number equal to the blades (7), and each of which is implanted in the rotating plate (38) and directly drives a pitch control rod (44) of a corresponding blade (7). Each multicyclic jack (45) is a dual-action, hydraulic linear jack controlled by a servo-valve (49) also implanted on the rotating plate (38).

23 Claims, 3 Drawing Sheets

CONTROL DEVICE FOR MONOCYCLIC PITCH IN A FIXED REFERENCE SYSTEM AND MULTICYCLIC PITCH IN A ROTATING REFERENCE SYSTEM FOR BLADES OF ROTORS OF ROTOR CRAFT

The present invention relates to a control device for monocyclic pitch in a fixed reference system and for multicyclic pitch in a rotating reference system, for the blades of rotors, in particular main or supporting rotors, of rotor crafts or, more generally, aerodynes with a wing unit which is at least partially rotating, such as helicopters and aerodynes of the types called "convertible" or "combined".

The device according to the invention is essentially intended for the equipment of the main rotors of helicopters and of tilt propellers or tilt rotors of convertible aerodynes, which are variable pitch rotors, in order to permit the control of the blades of these rotors in order to, on the one hand, ensure conventional control of the rotor or rotors in question by the introduction of general or collective pitch, which control is constant regardless of the azimuth of a given blade in rotation but variable simultaneously for all the blades of a rotor, and also of the cyclic or monocyclic pitch, which varies sinusoidally once per revolution of said blade and, on the other hand, to possibly permit the addition to the variations in collective pitch and in monocyclic pitch of any dynamic variation of the pitch in order to ensure the multicyclic control of the rotor or rotors in question.

It is known that the control of helicopters is conventionally obtained, on the one hand, by means of the control of the collective pitch of the blades of each main rotor, this control making it possible to vary the overall lift of the rotor and, on the other hand, by means of the monocyclic control of the pitch of the blades of each main rotor, making it possible to tilt the disk of the rotor, the combination of these two controls on the incidence of these blades resulting in the possibility of varying the amplitude and the tilt of the mean resulting stress developed by the rotor and, consequently, of controlling the helicopter supported by this rotor.

These conventional controls are introduced on most helicopters flying today by means of a complex swashplate device, having plates making it possible to simultaneously create on the blades of the main rotor, on the one hand, the control of the collective pitch of the blades by the axial displacement of the swashplates according to the axis of the rotor and, on the other hand, the sinusoidal control of the pitch or monocyclic control, the pulsation of which is equal to the rotation rate of the rotor, by means of the angular tilting of these swashplates with respect to the axis of the rotor.

Generally, the swashplates used to control the variation of the pitch of the blades of a rotor of a rotor craft, such as a helicopter, are mounted about the rotor mast and comprise a rotating plate, connected at its periphery by rods to the pitch control levers of the blades of the rotor and driven by the hub or the mast of the rotor, and by means of at least one connecting compass in rotation about the axis of the rotor mast, this rotating plate being mounted in rotation with the aid of at least one ball bearing on a nonrotating plate mounted about the rotor mast and sliding axially along the latter through the action of a collective pitch lever controlled by the pilot, the nonrotating plate also being articulated with respect to the rotor mast with the aid of a universal joint such that the plates may oscillate in every direction about the joint through the action of rods of the pilot controls on the nonrotating plate, this action being controlled from the cyclic control column controlled by the pilot.

The modes of operation and of control of the blades of the main rotors of helicopters give rise to vibrating excitations which are much greater than those observed on transport aircraft. The main cause of these high vibrating excitations is the main rotor of the helicopters, on which the aerodynamic speeds and variable incidences induced on the blades during their rotation, in particular in forward flight, develop considerable alternating stresses which, after transmission to the fuselage of the helicopter by means of the hub, are reflected in high periodic accelerations, above all when the helicopter is moving at high speed. These vibrations are the greater, the greater the load of the rotor (mass, load factor) and the forward speed. These vibrations result mainly in reducing comfort in the helicopter cabin, causing increased fatigue on the part of the crew, particularly during missions of long duration, and in developing high dynamic stresses in the hub and the structure of the helicopter, which causes fatigue in the material and associated equipment.

Regardless of the dynamic optimization of the rotors and structures, the means used hitherto in order to limit these vibration phenomena are essentially passive means of the antivibration or suspension type, disposed at the level of the rotor head, at the level of the connection between rotor and fuselage, and on the fuselage itself. Parallel to the passive means, which appear to have a limited future due to the fact that their mass risks being prohibitive with respect to satisfying increasingly stringent demands for comfort, associated with the increasingly high cruising speeds of modern helicopters, active means for control of the vibrations are also being studied and developed.

As a particular case of these active means for control of the vibrations, it has already been proposed to use a multicyclic control whose principle of action in this application consists in developing alternating stresses which, at the level of the main rotor, counteract the stresses generating vibrations.

With respect to a monocyclic pitch control, introduced by means of swashplates, a multicyclic (or harmonic) control is a more sophisticated control containing several harmonics of the rotation rate. It has also already been proposed to use such a multicyclic control not only to reduce the stresses or vibration rates, but also to seek to improve the qualities of flight, to push back the limits of the flight envelope and to obtain gains in performance, particularly by controlling stall on the retreating blade or blades of the main rotor in question.

It has also been noted that a multicyclic control of the main rotor of a helicopter, as a system for active control of vibrations, lends itself favorably to integration in an electric flight control system, making it possible to ensure a generalized automatic control of the helicopter.

In a first known embodiment, it has been proposed to introduce the multicyclic control at the level of the control rods of the nonrotating plate of a conventional swashplate device, such that the multicyclic control is simply added to the conventional monocyclic and collective control, corresponding to a constant in a fixed reference system, that is to say without taking into consideration the rotation about the axis of the rotor. The sole advantage of such an embodiment is in retaining the conventional monocyclic control system with swashplates and pitch rods, to which are added multicyclic linear actuators, such as electrohydraulic jacks, called "multicyclic" jacks, which are placed in series on the conventional servocontrols, which are mechanically fed, of the longitudinal displacement and of the tilt of the nonrotating plate. Thus, by a judicious choice of the amplitude and of the phase of the commands sent to the three multicyclic jacks, it is therefore possible to counteract the generation of the vibrations at the level of the main rotor.

In contrast to such a superposition of a conventional monocyclic control and of a multicyclic control, it has already also been proposed to effect the multicyclic control by means of a direct control, in a rotating reference system, with the aid of drive devices which each rotate with a blade whose pitch is controlled.

Among the various embodiments of this type which have been set forth in an article by Mr. Kenneth F. GUINN, entitled "Individual Blade Control Independent of a Swashplate" and published in the July 1982 issue of the "Journal of American Helicopter Society", one comprises, for each blade of the rotor in question, a linear actuator mounted outside the rotor mast and along the upper part of the latter, and articulated, via its upper end, on a coupling rotating with the rotor mast, and via its lower end, on a lever, also rotating with the rotor mast and mounted so as to pivot on the latter about an axis perpendicular to the axis of this mast. This pivoting lever, of which there is one for each blade, is articulated, on the one hand, on the upper end of a lower pitch control rod, whose lower end is driven with the rotating plate of the swashplate device and, on the other hand, on the lower end of an upper pitch control rod, whose upper end drives the pitch control lever of the corresponding blade.

This embodiment in which the multicyclic control is applied in a rotating reference system by linear actuators, which are hydraulic jacks rotating with the rotor about its axis and fed by power supply members also driven in rotation with the rotor mast and accommodated at least partially in the latter, also has the advantage of preserving the conventional monocyclic and collective control system with its swashplates and its rods for controlling the tilt and the translation of the nonrotating plate, the multicyclic control being applied in parallel to the monocyclic control on the upper part of this preserved conventional control system.

However, the two embodiments of the state of the art more precisely mentioned above present various disadvantages which arise from the mounting of the multicyclic actuators respectively below or above the swashplates and about the rotor mast. This immediately results in difficulties in reliably ensuring their hydraulic and electric supplies, since these actuators are electrohydraulic jacks, that is to say dual-action hydraulic jacks combined with electrohydraulic control servovalves. These problems are particularly marked when the multicyclic jacks are mounted in a rotating reference system and driven in rotation with the rotor, since, on the one hand, it is necessary to ensure the continuity of the hydraulic and electric supplies to the interfaces between the rotating members connected to the rotor and the nonrotating members connected to the fuselage of the helicopter and, on the other hand, to mount the different rotating members of such an installation so as to guarantee excellent mechanical behaviour of these members subjected to centrifugal force.

Moreover, the presence of multicyclic jacks and supply conduits projecting about the rotor mast and either above or below the swashplates results in an increase in the aerodynamic drag, either between the swashplates and the underside of the rotor, to a degree which may possibly interfere with the aerodynamic performance of the rotor head, or between the swashplates and the upper part of the fuselage, to a degree which may possibly interfere with the aerodynamic flow at the level of the entry to and/or about the turbine or turbines of the helicopter.

Finally, in the case of the abovementioned embodiment with multicyclic jacks in a rotating reference system, the individual rod system of each blade, consisting of the lower and upper pitch control rods and the lever oscillatng on the rotor mast and driven by a corresponding multicyclic jack, is a rod system with an adverse effect not only in terms of drag but also in terms of weight and cost.

Moreover, the articulations of this rod system, stressed by considerable high-frequency alternating stresses, may be subject to wear and consequently introduce play incompatible with a correct operation of the multicyclic control.

The invention aims to propose a control device for monocyclic pitch in a fixed reference system and multicyclic pitch in a rotating reference system, which preserves the advantage connected with retaining the conventional monocyclic and collective control system with swashplates, whilst remedying the abovementioned disadvantages of the devices of this type of the state of the art.

The invention also aims to propose such a pitch control device, in which virtually all the stresses, in particular centrifugal stresses, are taken up directly by means of a member which is already present in said conventional monocyclic and collective control system and available to this end because of its aptitude for suitable sizing.

A still further aim is to permit the embodiment of the assembly of the control members downstream of the power jacks with a maximum of rigidity and to make it possible, moreover, to avoid the risks of play arising, during operation, in the articulations, the lack of rigidity and/or the presence of play in this part of the control of the rotor transmitting high dynamic and static stresses which may, in flight, introduce serious vibration interference.

A still further aim of the invention is to propose such a pitch control device, whose bulk and drag are reduced by the integration of hydraulic components directly in the swashplates.

A still further aim of the invention is to propose such a pitch control device, in which the use of dynamic seals is in practice limited to the hydraulic jacks equipping the device, in order to simplify the production and the maintenance of the hydraulic circuits and to improve the reliability thereof.

Finally, a further aim of the invention is to propose such a pitch control device which has a simplified and lighter structure than the known embodiment with multicyclic jacks mounted in a rotating reference system above the swashplates.

To this end, the basic idea of the invention is to integrate directly into the swashplates of the conventional monocyclic and collective control system as many functions as possible which have to be fulfilled by the different members of such a control device for monocyclic pitch in a fixed reference system and multicyclic pitch in a rotating reference system.

The abovementioned aims are attained by virtue of the invention which proposes a control device for monocyclic pitch in a fixed reference system and multicyclic pitch in a rotating reference system for the blades of a rotor of a rotor craft, comprising, in order to ensure the control of collective monocyclic pitch in a fixed reference system, a swashplate assembly comprising:

a nonrotating plate mounted on the one hand, so as to slide axially about a fixed cylindrical guide, integrally attached to the structure of the rotor craft and substantially surrounding coaxially the rotor mast and, on the other hand, oscillating angularly by means of a universal joint on the axis of the rotor mast, at least one nonrotating compass articulated, on the one hand, on said structure of the rotor craft and, on the other hand, on said nonrotating plate, at least three pilot controlled actuators each of which is connected, on the one hand, to said structure of the rotor craft and, on the other hand, to said nonrotating plate in order to control the translation and tilt movements of said nonrotating plate respectively along said guide and on said universal joint, a rotating plate mounted in rotation by means of at least one bearing on said nonrotating plate and substantially coaxially to the latter, at least one rotating compass articulated, on the one hand, on said rotating plate and, on the other hand, on said rotor, and pitch control rods in a number equal to the blades of the rotor and each of which is connected, on the one hand, to said rotating plate and, on the other hand, to a pitch control lever of a corresponding blade of the rotor, the device also comprising, to ensure the multicyclic pitch control in a rotating reference system, multicyclic linear actuators, in a number equal to the blades of the rotor, disposed outside the rotor mast and substantially longitudinally with respect to the axis of the latter, and mounted so as to rotate with the rotor about said axis of the rotor mast such that each multicyclic actuator drives a pitch control rod of a corresponding blade of the rotor, the pitch control device according to the invention being defined in that the multicyclic linear actuator of each blade is a dual-action hydraulic jack with at least one body implanted on said rotating plate by means of one of the two elements constituted by its cylinder and its rod, whilst the other elements of the jack is directly articulated on said pitch control rod of the corresponding blade, each body of said jack being supplied from at least one hydraulic power circuit by means of at least one electrohydraulic control servovalve.

Clearly, the implantation of the multicyclic jacks in the rotating plate results in an improvement of the mechanical behavior of these components subjected to centrifugal force, by taking up the stresses being exerted on the multicyclic jack directly in the casing of the rotating plate.

Advantageously, in order to reduce the bulk and therefore the aerodynamic drag, and in order to improve the hydraulic supply of the rotating multicyclic jacks, each of the latter is integrated via its cylinder into the rotating plate and articulated directly via its rod to the corresponding pitch control rod.

An advantageous hydraulic supply of the multicyclic jacks will be ensured if, moreover, according to the invention, each control servovalve of a multicyclic jack is also mounted in a rotating reference system and supported by the rotating plate.

Advantageously, in this case, at least one control servovalve of a multicyclic jack is coupled to the cylinder of the multicyclic jack which it controls, or alternatively integrated into or attached to the rotating plate, which makes it possible to reduce as much as possible the length of the hydraulic connection pipes between the servovalves and the jacks which they control, and which also makes it possible to integrate these pipes directly into the rotating plate such that it is not necessary to produce them with the aid of piping attached to the swashplate device, and such that, also, the overall aerodynamic drag and vulnerability with respect to phenomena external to the swashplate device and with respect to the centrifugal force are considerably reduced.

Regardless of the arrangement adopted for mounting the control servovalves with respect to the multicyclic jacks, it is always advantageous, for the above-mentioned reasons, that at least one servovalve, but preferably each of them, is connected to the multicyclic jack which it controls by hydraulic pipes formed at least partially, but preferably entirely, by channels pierced in the rotating plate.

In order to further improve the recovery of all the stresses directly in the casing of the rotating plate and/or of the nonrotating plate, whilst ensuring a suitable hydraulic supply of the multicyclic jacks and the servovalves mounted in a rotating reference system, it is advantageous that these multicyclic jack control servovalves are supplied with hydraulic fluid from at least one hydraulic power circuit by means of at least one hydraulic collector essentially accommodated in the rotating and nonrotating swashplates.

Advantageously, this hydraulic collector is in communication with the multicyclic jack control servovalves via hydraulic pipes formed at least partially, but preferably entirely, by channels made in the rotating plate. As before, this step makes it possible to avoid the mounting of flexible or rigid conduits attached to the rotating plate, and reduces the aerodynamic drag of the assembly as well as the vulnerability, by virtue of the integration of the hydraulic supply channels in the casing of the rotating plate.

According to the invention, the same advantages may be achieved at the level of the nonrotating plate due to the fact that the hydraulic collector is in communication with at least one hydraulic power circuit of the rotor craft via hydraulic pipes formed at least partially by channels made in the nonrotating plate, at least one of these pipes and, if appropriate, each of two pipes, one of which ensures high-pressure supply and the other ensures low-pressure return, being connected to a high-pressure hydraulic supply unit and/or low-pressure hydraulic return unit, which is fixed on the structure of the rotor craft.

According to a characteristic peculiar to the invention, in order to ensure maximum integration of the components of the device into the swashplates, the hydraulic collector is annular and inserted between said rotating and nonrotating plates, into at least one of which this collector is partially integrated.

Advantageously, in order to facilitate the integration of the hydraulic collector into the swashplates whilst and in that reliability is improved and maintenance facilitated.

Advantageously, moreover, in order to simultaneously facilitate the production of the low-pressure hydraulic return pipe between the control servovalves of the multicyclic jacks and at least one hydraulic circuit of the rotor craft, and the recirculation of the leakage flows of the hydraulic collector, the latter comprises a lower end chamber delimited between the rotating and nonrotating plates, for the recovery of leakage flows from the collector and in which emerge, on the one hand, at least one channel internal to the rotating plate and in communication with the low-pressure return of at least one control servovalve and, on the other hand, at least one channel internal to the nonrotating plate and in communication with a low-pressure return pipe of the hydraulic circuit or circuits of the rotor craft.

In this case, at least one low-pressure return channel internal to the nonrotating plate is advantageously connected in a leakproof manner to a flexible, large-diameter return conduit, external to the nonrotating plate, and attaching said nonrotating plate to the hydraulic unit integrally attached to the structure of the rotor craft, in order to ensure a satisfactory pressure reduction of this returning hydraulic fluid of the control servovalves.

A more complete integration of the device into the retained conventional pitch control system is advantageously ensured if, moreover, at least one channel internal to the nonrotating plate and for supplying the hydraulic collector under high pressure is connected in a leakproof manner to at least one hydraulic circuit by means of at least one channel internal to the nonrotating compass.

In this case, in order to simplify assembly, it is advantageous that the upper branch of the nonrotating compass is a rod mounted so as to pivot via one end about a pivot connecting to the lower branch of this nonrotating compass, the other end of the rod being shaped as a ball joint articulated in a spherical seating of the nonrotating plate, the rod being, moreover, pierced by a longitudinal internal channel in communication, on one side, with a channel internal to the pivot and supplied with hydraulic fluid under high pressure from at least one hydraulic power circuit, the internal channel of the rod passing through the ball joint, on the other side, and emerging opposite a channel internal to the nonrotating plate and opening into the base of the spherical seating of this plate.

In order to further improve the integration of the device into the components constituting the retained conventional pitch control system, the lower branch of the nonrotating compass is, moreover, advantageously shaped as a double lever, comprising two rods rigidly connected to one another and mounted simultaneously so as to pivot via their ends and about two axes which are parallel to one another and perpendicular to the axis of the rotor mast, on one side on the pivot connecting to the upper branch of this nonrotating compass and on the other side on a pivot connecting to the structure of the rotor craft, the channel internal to the pivot connecting to the upper branch being supplied with hydraulic fluid under high pressure via at least one internal longitudinal channel made in at least one of the two rods of the double lever and itself in communication with a channel internal to the pivot connecting to the structure, and which is supplied with hydraulic fluid guaranteeing a favourable mounting in rotation for the rotating plate and for any rotating member of the hydraulic collector, the latter is implanted between two bearings spaced axially about the rotor mast and by means of which said rotating plate is mounted in rotation on said nonrotating plate.

This arrangement lends itself advantageously to the use of a hydraulic collector which is of the type comprising a rotating joint for transferring of hydraulic fluid under high pressure between two substantially coaxial parts, driven in relative relation one within the other, one of which is integrally attached in rotation to the rotating plate and the other is integrally attached in rotation to the nonrotating plate.

Moreover, according to the invention, the rotating transfer joint advantageously used is of the type comprising two substantially coaxial annular members of revolution, one of which is in radial contact with the nonrotating plate via two static seals, axially spaced on either side of a distribution groove of revolution on this member, and opposite a distribution groove of the nonrotating plate, in which emerges at least one channel internal to the latter and in communication with a high-pressure supply pipe, the other member of the rotating transfer joint being in radial contact with the rotating plate, also via two static seals axially spaced on either side of a distribution groove of revolution on this other member, and opposite a distribution groove of the rotating plate, in which emerges at least one channel internal to the latter for the high-pressure supply of at least one control servovalve of a multicyclic jack, one of the two members of the rotating transfer joint surrounding, with little radial play, an axial part of the other member and carrying a ring of revolution projecting axially and radially with respect to the member carrying it and engaged with play in a groove of revolution made in the other member and forming, opposite the two members and between the latter, radial and coplanar sealing slits extending on either side of a distribution transfer groove, also of revolution, made in the other member and in communication with the other distribution groove of this other member via at least one channel internal to the latter, whilst the ring is pierced with a transfer channel, emerging at one end, opposite said distribution transfer groove and, at the other end, opposite a channel pierced in the member carrying the ring and in communication with the other distribution groove of this member. It is thus possible to attain various advantages peculiar to this known type of rotating joint for the transfer of hydraulic fluid between two parts in relative rotation one within the other, these advantages consisting, more particularly, in that a transfer joint of this type works in hydraulic friction, ensuring very low friction couples at high rotational speeds and high transfer pressures, in that the coplanar sealing slits may be kept at predetermined values, and therefore the members of the joint may be kept in predetermined positions by a hydrostatic automatic control tolerating a relatively large radial play and a certain lack of alignment or distortion between the nonrotating plate and the rotating plate, in that the release of heat from such a transfer joint during operation is relatively small, in that the leakage flows between the two members in relative rotation of the transfer joint are limited, in that the contacts and the seals between the members of the rotating transfer joint and the rotating and nonrotating plates are ensured solely by static seals, such that the use of dynamic seals is restricted to the jacks of the device, under high pressure from the hydraulic unit integrally attached to the structure.

In a simple manner, the hydraulic connection between this hydraulic unit and the channel internal to the pivot connecting to the structure may be ensured by at least one external hydraulic conduit connected in a leakproof manner to at least one axial end of this connecting pivot into which emerges the channel internal to this pivot.

In a well known manner, the pilot control actuators may be three conventional servocontrols, mechanically fed, in which the slide of each one is connected to at least one hydraulic circuit of the rotor craft and is controlled by the rods connected via a suitable linkage to the control columns of cyclic pitch and collective pitch which are at the disposal of the pilot. However, according to a technical step peculiar to the invention, it is advantageous that each of the pilot control actuators is a dual-action, hydraulic linear monocyclic jack with at least one body, which is connected via its cylinder to the structure of the rotor craft and via its rod to the nonrotating plate, and which is controlled by at least one nonrotating servovalve integrally attached to the cylinder of said corresponding monocyclic jack and connected via nonrotating hydraulic conduits to the hydraulic unit connecting to at least one hydraulic power circuit of the rotor craft.

For safety reasons, it is, moreover, advantageous for each multicyclic jack and, if appropriate, each monocyclic jack to be supplied with hydraulic fluid from at least one main hydraulic power circuit and from a backup hydraulic circuit which are mounted on the rotor craft and coupled together by at least one automatic valve switching between the circuits, this valve being mounted in a fixed reference system upstream of the hydraulic collector or collectors such that the switching of the connection to the hydraulic backup circuit is automatically ensured in the event of failure in the main hydraulic circuit.

In order to control the pitch of each blade, it is also advantageous to ensure a redundancy of the control in order to improve safety, and this may be ensured by the fact that each multicyclic jack is a double-body jack with two stages in tandem, each stage of which is controlled by one respectively of two corresponding control servovalves, each of which is supplied by one respectively of two superposed hydraulic collectors and each in communication with one respectively of two main hydraulic power circuits of the rotor craft.

Finally, advantageously, each control servovalve of the multicyclic jack of each blade of the rotor is itself controlled by orders originating from at least one electrical and/or optical collector mounted in a rotating reference system in the rotor mast, these orders being produced from signals supplied by at least one sensor of the angular position of the corresponding blade about its pitch change axis, such that the angular position of each blade is suitably determined by means of an control loop of this angular position.

Figure 2:
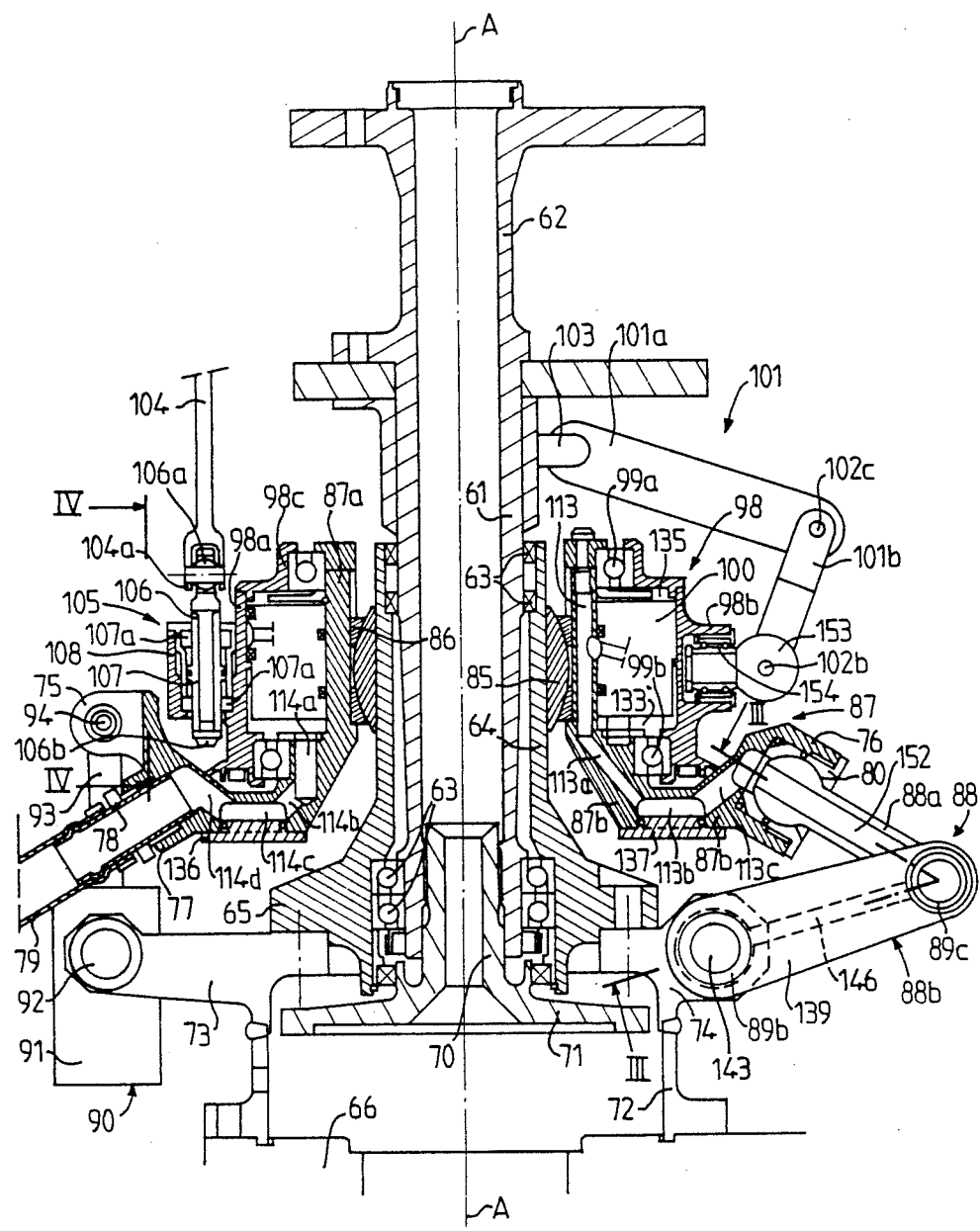
Figure 3:
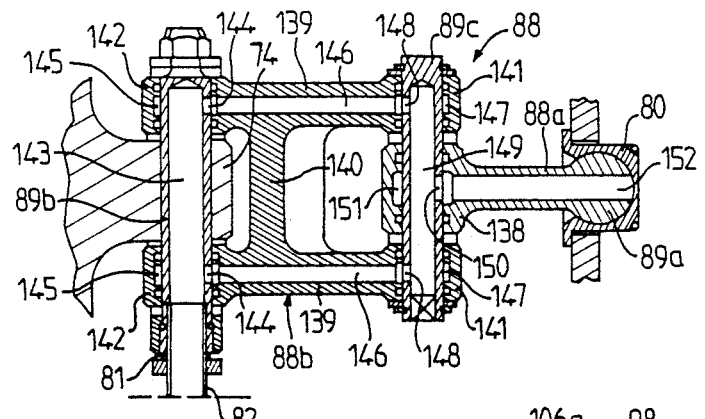
Figure 4:
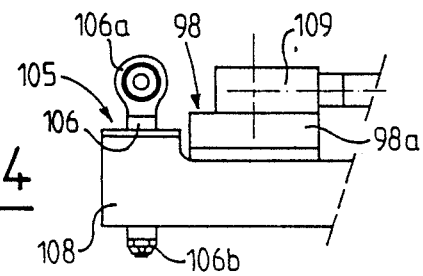
Figure 5:
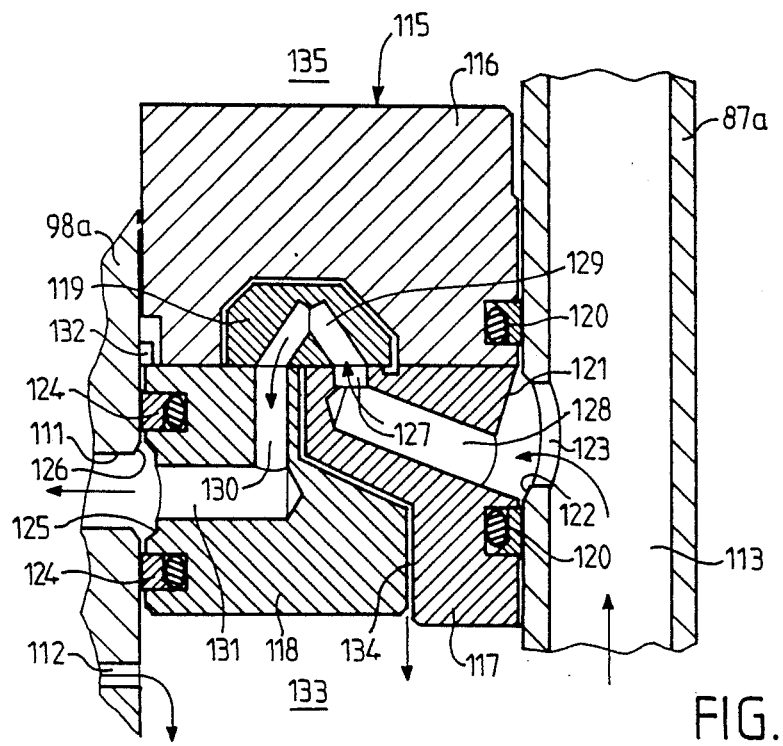

The invention will be better understood and further advantages and characteristics of the invention will emerge upon reading the description given below, in a nonlimiting manner, of illustrative embodiments described with reference to the appended drawings, in which:

FIG. 1 is a diagrammatic view in axial section of a main rotor head of a helicopter with its rotor mast, equipped with a pitch control device according to the invention, FIG. 2 is a view in axial section of another example of the pitch control device according to the invention, mounted in a similar manner about the mast of a main rotor of a helicopter, FIG. 3 is a view in section broken along III—III of the nonrotating compass of the device in FIG. 2, FIG. 4 is a partial view in lateral elevation of the device and according to the arrow F in FIG. 2, and FIG. 5 is a partial and diagrammatic diametral section of the hydraulic collector of the device in FIGS. 2 to 4.

The main rotor of a helicopter shown in FIG. 1 comprises a tubular rotor mast 1 which is integrally attached via its upper end to a hub 2 and mounted in rotation via two bearings 3, offset longitudinally with respect to the axis A of the rotor mast 1, that is to say with respect to the axis of rotation of the rotor, inside a cylindrical, tubular and coaxial guide sleeve 4, fixed by means of an external radial flange 5 of its lower end to the structure 6 of the helicopter on the upper part of the fuselage of the latter.

The rotor mast 1 is integrally attached in rotation, via its lower end, to the output shaft of the main gear box (not shown) of the helicopter, which is also supported by the structure in the upper part of the fuselage such that the rotor mast 1 and the hub 2 are driven in rotation about the axis A above the fuselage of the helicopter.

For each of the blades 7 of the rotor, the hub 2 comprises two upper 8 and lower 9 radial plates which are superposed and spaced axially from one another in order to accommodate between them a sleeve 10 connecting the corresponding blade 7 to the hub 2. The root 11 of each blade 7 is held by two diametral spindles 12, perpendicular to the longitudinal axis of the blade 7, in a cylindrical bush 13 which is mounted coaxially and in rotation about its axis X—X in the radial bore, with respect to the axis A, of the sleeve 10, by virtue of two bearings 14 offst from one another along the axis X—X, and the root 11 of the blade 7 is extended radially towards the axis A by a flexible and twistable arm 15, passing axially through the bush 13 and whose internal radial end 16 is held in the base of the sleeve 10 about an axis coincident with the axis of drag Y—Y, parallel to the axis A of the rotor, and about which the sleeve 10, and therefore also the bush 13 and the blade 7 with its root 11 and its flexible and twistable arm 15, are mounted in rotation in the upper 8 and lower 9 plates by means of upper 17 and lower 18 journals which are integrally attached to the sleeve 10 and engaged in two bearings 19 mounted in these plates 8 and 9.

The angular oscillations of the blade 7 and of its sleeve 10 in drag about the axis Y—Y are absorbed and a resilient return towards an initial position of rest of the blade 7 is ensured by a drag absorber 20 which is, for example, of the type comprising a rigid central metal plate 21 held on the hub 2 and connected via viscoelastic elastomeric layers 23 to each of two rigid external metal plates 22, between which the central plate 21 is inserted, and which are held on the sleeve 10, for example at the level of the upper journal 17.

Each blade 7 is flexible in flapping such that it is futile to provide a flapping articulation at the level of the connection of the sleeve 10 to the hub 2.

Finally, the changes in incidence of each blade 7 by rotation about its pitch change axis, coincident with the axis X—X of the bush 13, are permitted by the rotation of this bush 13 with the blade root 11 in the sleeve 10, and by the torsional deformation of the connection arm 15, which also ensures a return towards an initial position of the blade about its pitch axis X—X. The changes in pitch are introduced on the blade 7 by a pitch control lever 24 integrally attached to the external radial end of the bush 13 and projecting downwards and laterally on this bush 13.

The changes in pitch are controlled by a control device for monocyclic pitch in a fixed reference system and for multicyclic pitch in a rotating reference system, which includes the essential components of a conventional pitch control system with swashplates. This pitch control device comprises, in addition to the guide sleeve 4, an annular ball pivot slide 25 mounted coaxially and so as to slide axially via its central cylindrical bore about the guide sleeve 4, and whose external lateral face in the form of a convex segment of a sphere interacts with the concave internal lateral face, of corresponding form, of a coaxial annular support 26 thus mounted so as to oscillate in any direction with respect to the axis A on the pivot slide 25. This oscillating support 26 is integrally attached to the axial part 27a of an annular plate 27 which surrounds it and has a transverse section substantially in the form of a L, whose radial part 27b is connected to the structure 6 of the helicopter, on the one hand by a nonrotating compass 28 and, on the other hand, by three pilot control actuators 30, only one of which, in a central position and towards the front, is shown in FIG. 1, whilst each of the other two is offset laterally by 120 degrees with respect to the central actuator 30 and on each side of the latter.

The upper branch 28a of the nonrotating compass 28 is mounted so as to pivot at its upper end and via the pivot 29a on the rear of the radial part 27b of the plate 27, whilst the lower branch 28b of this compass 28 is mounted so as to pivot at its lower end and via a pivot 29b in a yoke attached to the rear end of the radial flange 5 fixed to the structure 6, and whilst the two branches 28a and 28b of the compass 28 are mounted so as to pivot on one another via a pivot 29c, the axes of the pivots 29a, 29b and 29c being parallel to one another and perpendicular to the radial plane passing through the axis A and the median plane of the branches of this compass 28. In this manner, the nonrotating compass 28 locks the plate 27 against any rotation about the axis A without interfering with the axial translations or the angular oscillations of the nonrotating plate 27 respectively with the slide 25 along the guide 4 and with the oscillating support 26 on the pivot slide 25, these translations and oscillations being controlled by the pilot control actuators 30.

These actuators may be conventional servocontrols, whose slides are, on the one hand, directly supplied with hydraulic fluid under pressure by the hydraulic power circuit or circuits of the helicopter and, on the other hand, controlled by rods connected via a linkage to the cyclic and collection pitch control columns at the disposal of the pilot.

However, in this example, each actuator 30 is an electrohydraulic and monocyclic jack consisting of a substantially vertical, hydraulic linear jack, with dual action and a single body, whose cylinder 31 is mounted so as to pivot, via its lower end on the structure 6, about a pivot 32, and whose rod 33 is mounted so as to pivot, via its upper end on the nonrotating plate 27, about a pivot 34, the axes of the pivots 32 and 34 being parallel to one another and perpendicular to the radial plane passing through the axis A and through the axis of the jack 30, and a servovalve 35 controlling this jack is coupled to its cylinder 31. The servovalve 35 of the nonrotating monocyclic jack 30 is connected by nonrotating hydraulic conduits 36a and 36b respectively to the high-pressure hydraulic supply stage and to the low-pressure hydraulic fluid return stage of a hydraulic unit 37 fixed on the structure 6 and connected to either a main hydraulic power circuit or a backup hydraulic circuit of the helicopter (not shown) by an automatic switching valve, also accommodated in the unit 37, and thus ensuring, in a fixed reference system, the coupling between these two hydraulic circuits.

The electric control stage of each of the three servovalves 35 is controlled by electric orders transmitted to it electrically and/or optically in a fixed reference system, which orders correspond to the movements of the cyclic and collective pitch control columns controlled by the pilot.

The pitch control device also comprises a rotating plate 38, of which a cylindrical and tubular part 38a is mounted coaxially in rotation about the axial part 27a of the nonrotating plate 27 by two bearings 39 which are offset axially from one another and between which is implanted an annular hydraulic collector 40, thus interposed between the nonrotating 27 and rotating 38 plates and whose function will be described hereinafter.

The rotating plate 38 is driven in rotation with the rotor mast by a rotating compass 41 whose upper branch 41a is mounted so as to pivot, via its upper end, on a coupling 43 projecting radially from the rotor mast 1, about a pivot 42a, whose lower branch 41b is mounted so as to pivot, via its lower end, on a coupling presented by the upper edge of the axial part 38a of the rotating plate 38, about a pivot 42b, the upper and lower branches 41a and 41b of the compass being mounted so as to pivot on one another about a pivot 42c, and the axes of the pivots 42a, 42b and 42c being parallel to one another and perpendicular to the radial plane passing through the axis A and through the two branches of the compass 41.

The movements of the rotating plate 38, which not only rotates about the axis A and on the nonrotating plate 27 but also moves in a translational manner and oscillates with the nonrotating plate 27, are transmitted to each blade 7 via a pitch control rod 44 whose upper end is articulated on the end of the corresponding pitch control lever 24. The lower end of the rod 44 is not articulated directly on the rotating plate 38 but on the upper end of the rod 46 of a multicyclic jack 45 implanted in the rotating plate 38.

This jack 45 is a dual-action, hydraulic linear jack, with a single body to simplify the description, whose rod 46 carries a piston 47 mounted so as to slide in a leakproof manner in a bore directly made in an external radial part 48 of the rotating plate 38, which forms the cylinder of the jack integrated into this plate 38, such that the piston 47 defines, in the bore of the cylinder 48 which accommodates it, the two working chambers of the jack, whose volumes vary in opposite directions. Each of these jacks 45, in a number equal to the blades 7 of the rotor, is supplied with high-pressure hydraulic fluid by a control servovalve 49 which is directly coupled and fixed to the rotating plate 38 and to the cylinder 48 and rotates with them, and which is in communication with each of the two working chambers of the jack 45 via one respectively of two hydraulic pipes 50a and 50b formed by channels pierced directly in the rotating plate 38 and in its part forming the cylinder 48 of the corresponding jack 45.

The servovalve 49 is itself connected to the part rotating with the rotating plate 38 of a rotating joint for transferring hydraulic fluid, included within the hydraulic collector 40, via a rotating high-pressure hydraulic supply conduit 51 and a low-pressure rotating hydraulic return conduit 52, part of each one of which is formed by a channel 51a or 52a directly pierced in the rotating plate 38.

In a similar manner, the part of the rotating transfer joint of the hydraulic collector 40 which is nonrotating with the nonrotating plate 27 is connected to the hydraulic unit 37 via a high-pressure nonrotating supply conduit 53 and a low-pressure nonrotating return conduit 54, a part of each of which is formed by a channel 53a or 54a directly pierced in the nonrotating plate 27.

The parts of the hydraulic conduits 51, 52, 53 and 54 which are not formed by the channels pierced in either of the plates 27 or 38 consist of flexible or rigid piping.

Thus, each of the electrohydraulic and multicyclic jacks 45, mounted in a rotating reference system, is controlled by a servovalve 49 which is itself mounted in a rotating reference system and supplied with hydraulic fluid from the hydraulic unit 37, in a fixed reference system, by means of the hydraulic collector 40 implanted between the rotating 38 and nonrotating 27 plates. In this manner, each rotating multicyclic jack 45 makes it possible to introduce, on the pitch control lever 24 of the corresponding blade 7, a multicyclic control in a rotating reference system, which is added to the control of collective pitch and monocyclic pitch ensured in a fixed reference system by the three monocyclic jacks 30.

The angular position of each blade 7 about its pitch change axis X—X is defined by a closed loop comprising three angular position sensors 55 uniformly distributed in a circumferential direction inside the external radial end of the sleeve 10 and between the latter and the bush 13 integrally attached to the blade root 11, which sensors 55 thus detect the angular changes in position about its axis X—X with respect to the sleeve 10. These sensors 55 supply output signals to the computers (not shown) on board the helicopter and which produce the control orders which are transmitted optically and/or electrically, in a fixed reference system, to an electrical collector 56 which is mounted in the base of the rotor mast 1. These orders are transmitted in a rotating reference system from this electrical collector 56 to the electric control stages of the servovalves 49 in order to ensure the corresponding control of the multicyclic jacks 45, in order to drive the levers 24 which cause the blades to rotate about their pitch axis X—X.

The pitch control device thus produces is self-adapting. For safety reasons, each of the three rotation sensors 55 of a blade 7 is connected to one respectively of three computers which itself controls one respectively of three torque motors of the electrical control stage of the corresponding servovalve 49. Similarly, for safety reasons, each of the multicyclic jacks 45 may be a double-body jack, each body of which is controlled by one respectively of two servovalves, such as 49, each fed by one respectively of two superposed hydraulic collectors implanted between the rotating and nonrotating plates and themselves supplied in parallel from the hydraulic circuit or circuits of the helicopter.

On the pitch control device in FIG. 2, there is a fixed, tubular, cylindrical guide sleeve 64 in which a rotor mast 61, integrally attached to a rotor hub 62 at its upper end, is mounted in rotation about the axis of rotation A of the rotor via two axially spaced pairs of bearings 63. The rotor mast 61 is driven in rotation by internal longitudinal splines in its lower end part, engaging with external longitudinal splines on a drive shaft 70, fitted into the base of the rotor mast 61 and equipped with an external radial flange 71, by means of which this drive shaft 70 is coupled to the output shaft of the main gear box to the inside of a hollow seat connecting to the structure 66 of the helicopter and formed from the external radial flange 65 at the base of the guide sleeve 64 and from an annular casing 72 on which this flange 65 is fixed. This casing 72, fixed on the structure 66, has, projecting substantially radially on its upper edge, on the one hand, three fixed arms such as 73, each one of which supports in a pivoting manner about a pivot 92 perpendicular to the radial plane passing through the axis A, the cylinder 91 of one of three monocyclic jacks 90 controlling the collective pitch and the cyclic pitch and, on the other hand, a projection 74 on which is mounted, in a pivoting manner, the lower end of the nonrotating compass 88, whose particular structure will be described in detail hereinafter with reference to FIGS. 2 and 3.

There is also a slide with a convex ball pivot 85, sliding axially via its central cylindrical bore about the guide 64, and whose convex, external lateral surface interacts with a concave seating, in the form of a complementary segment of a sphere, of a support 86 surrounded by the tubular axial part 87a, to which it is integrally attached, of a nonrotating plate 87. This nonrotating plate 87 also comprises a substantially radial part 87b, shaped substantially as a trough open towards the hub 62 and whose external radial edge has, on the one hand, three rigid and radial couplings, such as 75, in each of which the upper end of the rod 93 of one of the three monocyclic jacks 90 is mounted so as to pivot on the pivot 94, parallel to the pivot 92, and, on the other hand, a hollow cylindrical joining piece 76 in which the attachment of the nonrotating compass 88 to the nonrotating plate 87 is ensured in a manner described hereinafter.

As in the above example, each of the three monocyclic jacks 90 is a linear electrohydraulic jack controlled by a servovalve (not shown) directly coupled to the corresponding cylinder 91 or integrated into the latter and itself supplied with hydraulic fluid via nonrotating conduits (not shown) from a hydraulic unit (not shown) connecting to the hydraulic circuits of the helicopter and which is mounted in a fixed reference system on the structure 66.

There is also a rotating plate 98 mounted coaxially in rotation on the nonrotating plate 87 via two bearings 99a and 99b offset axially from one another and between which a hydraulic collector 100 is implanted between the rotating plate 98 and the nonrotating plate 87 in order to supply the servovalves, such as 109 (FIG. 4) integrally attached to the rotating plate 98, therefore mounted in a rotating reference system, and each of which controls one of several multicyclic jacks 105 in a number equal to the blades of the rotor and implanted in the rotating plate 98. The upper bearing 99a is mounted between the upper end of the tubular axial part 87a of the nonrotating plate 87 and an annular cover 98c closing the upper end of a tubular axial part 98a of the rotating plate 98, whilst the lower bearing 99b is mounted between an internal radial edge of the trough part 87b of the nonrotating plate 87 and the thickened lower end, projecting radially inwards, of the axial part 98a of the rotating plate 98. In this manner, the annular hydraulic collector 100 is accommodated in the swashplates 87 and 98 and partly enclosed in the nonrotating plate 87 and partly in the rotating plate 98. The axial part 98a of the latter carries, projecting radially outwards, on the one hand, a hollow tubular joining piece 98b, in which the attachment of the rotating compass 101 to the rotating plate 98 is ensured in a manner described hereinafter and, on the other hand, for each of the multicyclic jacks 105, that is to say for each of the blades (not shown) of the rotor, a unit 108 arranged as a cylinder for the corresponding jack 105.

In this example also, elach multicyclic jack 105 is a dual-action electrohydraulic linear jack, whose cylinder 108 is thus directly integrated into the rotating plate 98 and whose rod 106 carries an annular piston 107 mounted so as to slide in a leakproof manner in the cylinder 108 between two dynamic seals 107a closing the opposite working chambers of the jack 105. In this example, the rod 106 of the jack is hollow and its lower end, projecting beneath the cylinder 108, is closed by a stopper 106b, whilst its upper end has a ball joint rod end 106a, by means of which the rod 106 is coupled to a yoke 104a on the lower end of a pitch control rod 104, whose upper end is coupled to the pitch control lever (not shown) of the corresponding blade. As the two working chambers of the jack 105 are delimited in a cylinder 108 which is an integral part of the annular casing 98a of the rotating plate 98, on which the corresponding control servovalve 109 is directly connected, the hydraulic connection between these two chambers of the jack 105 and the servovalve 109 is ensured by hydraulic pipes entirely formed by channels pierced in the annular casing 98a. Similarly, the servovalve 109 is connected to the hydraulic collector 100 by hydraulic pipes formed entirely by channels pierced in this same annular casing 98a. The latter channels are partially shown in FIG. 5, with reference to which a description is presently given of the structure of the hydraulic collector 100 and in which there is also partially shown a channel pierced in the axial part 87a of the nonrotating plate 87 in order to supply the hydraulic collector 100 with high-pressure hydraulic fluid, the high-pressure hydraulic supply pipe and low-pressure hydraulic return pipe being more completely shown in FIGS. 2 and 3.

In fact, the hydraulic collector 100 used is of the type comprising a rotating joint for transferring hydraulic fluid under high pressure between two parts mounted one in the other and in relative rotation at high speed, this rotating transfer joint being, for example, of the type marketed under the name "Rotostat" by the company Glyco Industrie Automation, which joints are rotating joints with a large flow essentially transmitting a static pressure between an annular casing and an internal tubular member and which are driven in relative rotation with respect to one another, with a low leakage flow and with low friction couples.

A diametral half section of a rotating transfer joint of this type, implanted between the annular casing 98a of the rotating plate 98 and the axial tubular part 87a of the nonrotating plate 87, is diagrammatically shown in FIG. 5. This rotating transfer joint 115 essentially comprises four annular members 116, 117, 118 and 119, of revolution about a common axis which is the axis A of the rotor, and such that the members 116 and 117 respectively in an upper axial position between the parts 98a and 87a of the two plates and in an internal radial lower axial position about the part 97a of the nonrotating plate 87, are assembled together by means of screws (not shown), and on the part 87a of the nonrotating plate 87, against which they are applied via two static seals 120, spaced axially on either side of an internal radial groove of revolution 121 machined in the member 117 and opposite a groove of revolution 122 machined in the external radial face of the part 87a and in communication via an orifice 123 pierced in this part 87a with a longitudinal channel 113 also pierced in this part of plate 87a, for the hydraulic supply under high pressure. The two other main members of the joint 115 are a member 118 in an external radial lower axial position, which, with radial play, surrounds the member 117 connected to the nonrotating plate 87, and a ring 119 which is assembled via screws (not shown) to the member 118 and is accommodated, with radial and axial play, in a groove made in the lower radial face of the member 116, such that the ring 119 projects axially above the member 118 which carries it and projects radially inwards with respect to this member 118, and such that it extends above an external radial part of the upper face of the member 117. Moreover, the ring 119 and the member 118 which carries it are assembled to the annular casing 98a of the rotating plate 98, against which the member 118 is applied via two static seals 124 which are axially spaced on either side of an external radial groove of revolution 125 machined in the member 118 opposite the groove of revolution 126 machined in the internal radial face of the annular casing 98a of the rotating plate 98 and into which emerge channels 111 pierced in this casing 98a and each of which ensures the high-pressure hydraulic supply of a servovalve 109 controlling a multicyclic jack 105.

The ring 119 is connected, with slight axial play determined by a thin spacer, to the member 118, such that slits located in a same radial plane are delimited between, on the one hand, the ring 119 and the upper member 116 and, on the other hand, the two lower members 117 and 118, these coplanar slits extending radially inside and outside of a machined distribution groove of revolution 127 in the external radial part of the member 117, opposite the ring 119 and in communication, via a channel 128 pierced in the member 117, with the internal radial groove 121 of this member 117. Opposite the groove 127 emerges one end of a bent channel 129, pierced in the ring 119, whose other end emerges opposite a channel 130 pierced axially in the member 118 and in communication, via a radial channel 131, also pierced in this member 118, with the external radial groove 125 presented by this member 118.

The hydraulic fluid under pressure arrives in the annular part 87a of the nonrotating plate 87 via the channel 113 internal to this plate and flows, via the orifice 123 and the groove 122, into the groove 121, from which the fluid flows, via the channel 128, to the distribution groove 127 of the member 117. The fluid under pressure is transferred from this distribution groove 127 into the channel 129 of the ring 119, then into the channels 130 and 131 of the member 118 to the groove 125 of the latter, from which the fluid flows into the groove 126 of the annular casing 98a of the rotating plate 98, and from this groove, via the channels will internal to this casing 98a, to the servovalves 109. As the distribution groove 127 emerges into the plane of the abovementioned coplanar slits, a differential pressure is established in these slits, which delimit two opposite surfaces of different values on the ring 119 and the opposite members 117 and 118, and a flow of hydraulic fluid at this differential pressure circulates about the ring 119, between the latter and the walls and the base of the groove accommodating it. On the one hand, the high pressure prevailing in the distribution groove 27 and, on the other hand, the differential pressure created by the coplanar slits are exerted on the opposite surfaces delimited by these coplanar slits, such that, in an equilibrium state of the joint, these two pressures create two opposite forces of equal value. Any external force which tends to cause a relative displacement of the part of the joint 116, 117 which is in contact with the nonrotating plate 87 and of the part of the joint 118, 119 which is in contact with the rotating plate 98, involves a variation in the value of the coplanar slits, therefore a variation in the differential pressure being established in these slits, such that the resultant of the forces being exerted on the two parts of the joint tend to bring these two parts into a position of equilibrium. The result of this is a hydrostatic automatic control maintaining the coplanar slits at a predetermined value and tolerating a relatively large radial play as well as a certain lack of alignment or deformation of the rotating plate with respect to the nonrotating plate. The axial positioning of the joint 115 is ensured by the application of the upper face of the member 118, integral in rotation with the rotating plate 98, against a plane stop surface of the rotating plate 98, projecting radially inwards towards the nonrotating plate 87, and such as defined, for example, via the radial shoulder 132 in FIG. 5, this support being ensured by at least one resilient member such as a spring washer (not shown) stressing the member 118 at the level of its lower face.

The low-pressure return pipe of each servovalve 109 towards the hydraulic collector 100 is formed by a channel 112 pierced in the annular casing 98a of the rotating plate 98 and emerging in a low-pressure collecting chamber 133 made in the hydraulic collector 100, below the rotating transfer joint 115 and above the lower bearing 99b, and between the parts 87a and 98a of the nonrotating 87 and rotating 98 plates. This low-pressure collecting chamber 133, partially shown in FIG. 5, also collects the leakage flow flowing via the radial play 134 between the two members 117 and 118 in a lower position of the joint 115. It should also be noted that the hydraulic fluid flowing between the upper member 116 of this joint 115 and the annular casing 98a is collected in the upper chamber 135 (see FIG. 5) of the hydraulic collector 100, above the joint 115 and under the upper bearing 99a, this chamber 135, in an upper position, itself being connected to the low-pressure collecting chamber 133, in a lower position, via at least one channel (not shown) pierced in the part 87a of the nonrotating plate 87.

The rotating transfer joints of this type, which are known and patented in the name of Cyphelly, are joints working in viscous friction and counteracting only low friction couples, even when they operate at high pressure and high rotational speed.

The return of the hydraulic fluid from the low-pressure collecting chamber 133 of the collector 100 towards the hydraulic circuit or circuits of the helicopter is ensured by a return pipe formed by the channels internal to the trough part 87b of the nonrotating plate 87 and by a flexible conduit, in the manner described hereinafter.

These return channels internal to the nonrotating plate 87 are shown in FIG. 2, and comprise the axial channel 114a, pierced in the internal radial portion of the trough part 87b and emerging upwards in the low-pressure return chamber 133 of the hydraulic collector 100, and downwards in an inclined channel 114b, pierced in the base of the trough 87b from a recess 114c, machined in this base and blocked by a leakproof stopper 136, in order to form a conduit connected to another inclined channel 114d, also pierced in the base of the trough 87b from the recess 114c and itself emerging at the base of a hollow cylindrical joining piece 77 presented by the trough 87b projecting outwards and downwards. A joining element 78 for leakproof connection to flexible piping 79, which does not rotate and has a large diameter in order to ensure satisfactory pressure reduction of the returning hydraulic fluid, is connected in a leakproof and removable manner in the joining piece 77, and the other end of the flexible piping 79 is connected on the return of the hydraulic circuit or circuits of the helicopter by means of the abovementioned hydraulic unit (not shown) fixed on the structure of the helicopter.

In order to supply the hydraulic collector 100, the supply of high-pressure hydraulic fluid in the channel 113, internal to the axial part 87a of the nonrotating plate 87, is ensured by a hydraulic pipe partially formed from channels internal to the trough 87b of this plate 87 and channels internal to the nonrotating compass 88, as presently described with reference to FIGS. 2 and 3. These channels internal to the trough 87b comprise a channel 113a emerging at the lower end of the channel 113 and pierced in an inclined manner in the internal radial portion of this trough, from a recess 113b machined in the base of this trough 87b and blocked by a leakproof stopper 137 in order to form a connecting conduit between the channel 113a and another inclined channel 113c pierced in the external radial portion of the trough 87b from the recess 113b and which itself emerges in the base of the joining piece 76 which accommodates, in a leakproof manner, a concave spherical seating 80 with a base pierced in order to communicate with the channels 113c, 113b, 113a and 113.

The upper branch 88a of the nonrotating compass 88 is a rod whose upper end is shaped as a spherical pivot 89a, accommodated in the concave spherical seating 80, and whose lower end 138 is mounted so as to pivot in a leakproof manner about the central part of a tubular pivot 89c connecting to the lower branch 88b of this compass. This lower branch has the form of a H and consists of two lateral rods 139, parallel and symmetrical to one another, and a spacer 140 connecting them rigidly together (see FIG. 3). Via their upper end 141, the two rods 139 are mounted simultaneously so as to pivot in a leakproof manner about axial end parts of the tubular pivot 89c, on either side of the base 138 of the upper rod 88a, whilst, via their lower end 142, the two rods 139 are mounted simultaneously so as to pivot in a leakproof manner about axial end parts of a tubular pivot 89b whose central part passes through a bore made in the projection 74 on the fixed seat casing 72 of the device. The axial channel 143, internal to the pivot 89b, emerges at one axial end of this pivot which projects on the outside of a lower part 142 of a lower rod 139, and by means of which a joining element 81, connecting in a leakproof manner to piping 82, which is flexible and nonrotating, is connected in a leakproof manner to the pivot 89b. The other end of the piping 82 is connected to the high-pressure supply of the hydraulic circuit or circuits of the helicopter by means of the abovementioned hydraulic unit fixed on the structure. The central channel 143 of the pivot 89b is closed on the side of the end opposite this pivot but, via radial perforations 144 made in the parts of the pivot 89b which are accommodated in the lower ends 142 of the rods 139, this central channel 143 communicates with the grooves 145 internal to these lower ends 142 and in communication with the longitudinal channels 146 pierced according to the axis of the lower rods 139. These longitudinal channels 146 also emerge in the grooves 147 internal to the upper ends 141 of the lower rods 139 and in communication, via radial perforations 148 in the opposite parts of the tubular pivot 89c, with the axial channel 149 internal to this pivot 89c. In the central part of the latter, another radial perforation 150 causes its axial channel 149 to communicate with a groove 151 internal to the base 138 of the upper rod 88a, and in which emerges the lower end of an axial channel 152 pierced in the rod 88a and emerging, at its upper end, in the hole pierced in the base of the concave seating 80.

Thus, the hydraulic fluid under high pressure taken into the central channel 143 of the lower pivot 89b via the flexible piping 82 is transmitted, via the longitudinal channels 146 of the lower rods 139, then via the axial channel 149 of the pivot 89c and via the channel 152 of the upper rod 88a, to channels pierced in the nonrotating plate 87 in order to supply the hydraulic collector 100.

By means of construction, the axes of the pivots 89b and 89c are parallel to one another and perpendicular to the radial plane passing through the axis A and through the axis of the upper rod 88a.

As regards the rotating compass 101, its upper branch 101a is mounted so as to pivot, via its upper end, on a coupling 103 integrally attached to the rotor mast 61 and, via its lower end, on the upper end of its lower branch 101b about a pivot 102c with an axis parallel to the axis of pivot on the coupling 103 and perpendicular to the radial plane passing through the axis A and through the axis of the branches 101a and 101b. At its lower end, the lower branch 101b of this compass is mounted so as to pivot about a pivot 102b, with an axis parallel to that of the pivot 102c, on the head 153 of a joining piece 154 with a cylindrical body, mounted so as to swivel via bearings in the hollow joining piece 98b of the annular casing 98a of the rotating plate 98.

In this example, it is observed that almost all the stresses being exerted on the various components of the pitch control device, and especially centrifugal forces, are directly taken up by the casing of the rotating plate 98. The use of dynamic seals is essentially restricted to multicyclic 105 and monocyclic 90 jacks due to the fact that the hydraulic collector 100 comprises a rotating transfer joint 115 solely equipped with static seals. The integration of the swashplates 87 and 98 of the cylinders 108 of the multicyclic jacks 105, of the channels connecting them to the control servovalves, of the channels connecting the latter to the hydraulic collector and of the channels connecting the latter to the hydraulic circuits of the helicopter reduces the bulk of the device and the overall aerodynamic drag, whilst improving the protection of these essential components of the device.

It should be noted that the device according to the invention makes it possible to convert a conventional pitch control device, without multicyclic control, into a configuration with multicyclic control. The device according to the invention therefore makes it possible to reequip existing helicopters whilst retaining the overall architecture of their main rotos and of their control devices. Moreover, the assembly of the multicyclic jacks 105, the control servovalves 109 and the hydraulic collector 100, integrated into the swashplates 87 and 98, comprises no additional connecting element, which is a guarantee of reliability. Moreover, the mechanical elements of the hub which are greatly stressed during operation, such as the pitch control rods and the sleeves connecting the blades to the hub, do not support any additional mechanical element due to the multicyclic control.

In the example of FIG. 2, as in that of FIG. 1, the electric control of the servovalves 109 is ensured by an electrical and/or optical collector (not shown) belonging to a closed loop, also comprising sensors of the angular position of the blades about their pitch axis, and which is installed partially in a rotating reference system.

The control devices for monocyclic pitch in a fixed reference system and multicyclic pitch in a rotating reference system according to the invention make it possible to seek maximization of lift with equal power and/or minimization of power with equal lift. They also make it possible to seek a better distribution of the lift developed on a blade during its rotation about the axis of the rotor, which may lead to virtual elimination of the stall zones of the blades. By way of example, with a multicyclic scan in pitch of ±6°, corresponding to a quadricyclic control, it is possible to obtain an approximately 17% increase in lift.

Generally, these pitch control devices ensure gains in performance at high loads and/or at high speeds, and ensure considerable reductions in levels of vibrations.

We claim:
1. A control device for monocyclic pitch in a fixed reference system and multicyclic pitch in a rotating reference system for the blades (7) of a rotor of a rotor craft, comprising, in order to ensure the control of collective and monocyclic pitch in a fixed reference system, a swashplate (27, 38) assembly comprising:

a nonrotating plate (27) mounted, on the one hand, so as to slide axially about a fixed cylindrical guide (4), integrally attached to the structure (6) of the rotor craft and substantially surrounding coaxially the rotor mast (1) and, on the other hand, oscillating angularly by means of a universal joint (25) on the axis (A) of the rotor mast (1), at least one nonrotating compass (28) articulated, on the one hand, on said structure (6) of the rotor craft and, on the other hand, on said nonrotating plate (27), at least three actuators (30), under pilot control, each of which is connected, on the one hand, to said structure (6) of the rotor craft and, on the other hand, to said nonrotating plate (27) in order to control the translation and tilt movements of said nonrotating plate (27) respectively along said guide (4) and on said universal joint (25), a rotating plate (38) mounted in rotation by means of at least one bearing (39) on said nonrotating plate (27) and substantially coaxially to the latter, at least one rotating compass (41) articulated, on the one hand, on said rotating plate (38) and, on the other hand, on said rotor (1, 2), and pitch control rods (44) in a number equal to the blades (7) of the rotor and each of which is connected, on the one hand, to said rotating plate (38) and, on the other hand, to a pitch control lever (24) of a corresponding blade (7) of the rotor, the device also comprising, to ensure the multicyclic pitch control in a rotating reference system, multicyclic linear actuators (45), in a number equal to the blades (7) of the rotor, disposed outside the rotor mast (1) and substantially longitudinally with respect to the axis (A) of said rotor mast (1), and mounted so as to rotate with the rotor (1, 2) about said axis (A) such that each multicyclic actuator (45) drives a pitch control rod (44) of a corresponding blade (7) of the rotor, wherein the multicyclic linear actuator of each blade (7) is a dual-action hydraulic jack (45) with at least one body implanted on said rotating plate (38) by means of one of the two elements constituted by its cylinder (48) and its rod (46), whilst the other element of the jack (45) is directly articulated on said pitch control rod (44) of the corresponding blade (7), each body of said jack (45) being supplied from at least one hydraulic power circuit by means of at least one electrohydraulic control servovalve (49).

2. The pitch control device as claimed in claim 1, wherein each multicyclic jack (45) is integrated via its cylinder (48), into said plate rotating (38) and articulated via its rod (46) to said corresponding pitch control rod (44).

3. The pitch control device as claimed in claim 1, wherein each control servovalve (49) of a multicyclic jack (45) is also mounted in a rotating reference system and supported by said rotating plate (38).

4. The pitch control device as claimed in claim 3, wherein at least one control servovalve (49) of a multicyclic jack (45) is coupled to the cylinder (48) of the multicyclic jack (45) which it controls.

5. The pitch control device as claimed in claim 3, wherein at least one control servovalve (49) of a multicyclic jack (45) is integrated into or connected on said rotating plate (38).

6. The pitch control device as claimed in claim 3, wherein at least one control servovalve (49) is connected to the multicyclic jack (45) which it controls via hydraulic pipes formed, at least partially, by channels (50a, 50b) pierced in said rotating plate (38).

7. The pitch control device as claimed in claim 1, wherein the control servovalves (49) of the multicyclic jacks (45) are supplied with hydraulic fluid from at least one hydraulic power circuit by means of at least one hydraulic collector (40) essentially accommodated in said rotating (38) and nonrotating (27) swashplates.

8. The pitch control device as claimed in claim 7, wherein said hydraulic collector (40) is in communication with said control servovalves (49) of the multicyclic jacks (45) via hydaulic pipes (51, 52) formed at least partially by channels (51a, 52a) made in said rotating plate (38).

9. The pitch control device as claimed in claim 7, wherein said hydraulic collector (40) is in communication with at least one hydraulic power circuit of the rotor craft via hydraulic pipes (53, 54) formed at least partially by channels (53a, 54a) made in said nonrotating plate (27), and at least one of which is connected to a high-pressure hydraulic feed and/or low-pressure hydraulic return unit (37) which is fixed on the structure (6) of the rotor craft.

10. The pitch control device as claimed in claim 7, wherein said hydraulic collector (40) is annular and inserted between said rotating (38) and nonrotating (27) plates, into at least one of which it is partially integrated.

11. The pitch control device as claimed in claim 10, wherein said hydraulic collector (40) is implanted between two bearings (39) axially spaced about the rotor mast (1), and by means of which said rotating plate (38) is mounted in rotation on said nonrotating plate (27).

12. The pitch control device as claimed in claim 10, wherein said hydraulic collector (100) is of the type comprising a rotating joint (115) for transferring high-pressure hydraulic fluid between two substantially coaxial parts (87a, 98a), driven in relative rotation one into the other, one (98a) of which is integrally attached in rotation to the rotating plate (98) and the other (87a) of which is integrally attached in rotation to the nonrotating plate (87).

13. The pitch control device as claimed in claim 12, wherein said rotating transfer joint (115) comprises two substantially coaxial annular members of revolution (116-117, 188), one (116-117) of which is in radial contact with the nonrotating plate (87) via two static seals (120) axially spaced on either side of a distribution groove (121) of revolution on this member (116-117), and opposite a distribution groove (122) of the nonrotating plate (87), in which emerges at least one channel (113) internal to the latter and in communication with a high-pressure supply pipe, the other member (118) being in radial contact with the rotating plate (98), also via two static seals (124) axially spaced on either side of a distribution groove (125) of revolution on this member (118) and opposite a distribution groove (126) of the rotating plate (98), in which emerges at least one channel (111) internal to the latter for the high-pressure supply of at least one control servovalve (109) of a multicyclic jack (105), one (118) of the two members surrounding, with a slight radial play (134), an axial part (117) of the other (116-117) and carrying a ring of revolution (119) projecting axially and radially with respect to the member (118) carrying it and engaged with play in a groove of revolution made in the other member (116-117) and forming, opposite the two members and between the latter, radial and coplanar sealing slits extending on either side of a distribution transfer groove of revolution (127) made in the other member (116-117) and in communication with the other distribution groove (121) of this other member via at least one channel (128) internal to the latter, while the ring (119) is pierced with a transfer channel (129), emerging at one end, opposite said distribution transfer groove (127) and, at the other end, opposite a channel (120-131) pierced in the member (118) carrying the ring (119) and in communication with the other distribution groove (125) of this member.

14. The pitch control device as claimed in claim 7, wherein the hydraulic collector (100) comprises a lower end chamber (133) delimited between the rotating (98) and nonrotating (87) plates, for the recovery of the leakage flow from the collector (100) and in which emerges, on the one hand, at least one channel (112) internal to the rotating plate (98) and in communication with the low-pressure return of at least one control servovalve (109) of a multicyclic jack (105) and, on the other hand, at least one channel (114a-114b-114c-114d) internal to the nonrotating plate (87) and in communication with a low-pressure return pipe of at least one hydraulic circuit.

15. The pitch control device as claimed in claim 14, wherein at least one low-pressure return channel (114a-114b-114c-114d) internal to the nonrotating plate (87) is connected in a leakproof manner to a flexible, large-diameter return conduit (79), external to the nonrotating plate (87) and attaching said nonrotating plate to the hydraulic unit integrally attached to the structure of the rotor craft.

16. The pitch control device as claimed in claim 9, wherein at least one channel (113) internal to the nonrotating plate (87) and for supplying the hydraulic collector (100) under high pressure is connected in a leakproof manner to at least one hydraulic circuit by means of at least one channel (143-146-149-152) internal to the nonrotating compass (88).

17. The pitch control device as claimed in claim 16, wherein the upper branch of the nonrotating compass (88) is a rod (88a) mounted so as to pivot via one end (138) about a pivot (89c) connecting to the lower branch (88b) of said nonrotating compass (88), the other end (89a) of the rod (88a) being shaped as a spherical pivot articulated in a spherical seating (80) of the nonrotating plate (87), and wherein the rod (88a) is pierced with a longitudinal internal channel (152) in communication, on one side, with a channel (149) internal to the pivot (89c) and supplied with hydraulic fluid under high pressure from at least one hydraulic power circuit, the internal channel (152) of said rod (88a) passing through the spherical pivot (89a), on the other side, and emerging opposite a channel (113c) internal to the nonrotating plate (87) and opening into the base of the spherical seating (80) of said nonrotating plate (87).

18. The pitch control device as claimed in claim 17, wherein the lower branch (88b) of the nonrotating compass (88) is shaped as a double lever, comprising two rods (139) rigidly connected to one another (1409 and mounted simultaneously so as to pivot via their ends (141, 142) and about two axes which are parallel to one another and perpendicular to the axis (A) of the rotor mast (61), on one side on the pivot (89c) connecting to the upper branch (88a) of said nonrotating compass (88) and on the other side on a pivot (89b) connecting to the structure (74) of the rotor craft, said channel (149) internal to the pivot (89c) connecting to the upper branch (88a) being supplied with hydraulic fluid under high pressure by at least one internal longitudinal channel (146) made in at least one of the two rods (139) of the double lever (88b) and itself in communication with a channel (143) internal to the pivot (89b) connecting to the structure (74) and which is supplied with hydraulic fluid under high pressure from the hydraulic unit integrally attached to the structure.

19. The pitch control device as claimed in claim 18, wherein the hydraulic connection between said hydraulic unit and said channel (143) internal to the pivot (89b) connecting to the structure (74) is ensured by at least one external hydraulic conduit (82) connected in a leakproof manner to at least one axial end of said connecting pivot (89b) into which emerges the channel (143) internal to this pivot.

20. The pitch control device as claimed in claim 1, wherein each of the pilot control actuators is a dual-action, hydraulic linear monocyclic jack (30) with at least one body, which is connected via its cylinder (31) to the structure (6) of the rotor craft, and via its rod (33) to the nonrotating plate (27), and which is controlled by at least one nonrotating servovalve (35) integrally attached to the cylinder (31) of said jack (30) and connected via nonrotating hydraulic conduits (36a, 36b) to said hydraulic unit (37) connecting to at least one hydraulic power circuit of the rotor craft.

21. The pitch control device as claimed in claim 7, wherein each multicyclic jack (45) and, if appropriate, each monocyclic jack (30) is supplied with hydraulic fluid from at least one main hydraulic power circuit and from a backup hydraulic circuit which are mounted on the rotor craft and coupled together by at least one automatic valve switching between said circuits, this valve being mounted in a fixed reference system upstream of the hydraulic collector or collectors (40).

22. The pitch control device as claimed in claim 7, wherein each multicyclic jack is a doublebody jack with two stages in tandem, each stage of which is controlled by one respectively of two corresponding control servovalves, each of which is supplied by one respectively of two superposed hydraulic collectors and each in communication with one respectively of two main hydraulic power circuits of the rotor craft.

23. The pitch control device as claimed in claim 1, wherein each control servovalve (49) of the multicyclic jack (45) of each blade (7) of the rotor is itself controlled by orders originating from at least one electrical and/or optical collector (56) mounted in a rotating reference system in the rotor mast (1) and produced from signals supplied by at least one sensor (55) of the angular position of the corresponding blade (7) about its pitch change axis (X—X).

* * * * *

UNITED STATES PATENT AND TRADEMARK OFFICE
CERTIFICATE OF CORRECTION

PATENT NO. : 4,952,120

DATED : August 28, 1990

INVENTOR(S) : Jacques A. AUBRY et al.

It is certified that error appears in the above-identified patent and that said Letters Patent is hereby corrected as shown below:

On the cover page, Item [73], delete "Société Nationale Industrielle et Aérospatiale des Poudres et Explosifs" and substitute therefor --aérospatiale SOCIETE NATIONALE INDUSTRIELLE--.

Signed and Sealed this

Twelfth Day of May, 1992

Attest:

DOUGLAS B. COMER

*Attesting Officer*     *Acting Commissioner of Patents and Trademarks*